No. 735,224. PATENTED AUG. 4, 1903.
C. E. DUNN.
CORN HUSKING MACHINE.
APPLICATION FILED OCT. 26, 1901.
NO MODEL. 4 SHEETS—SHEET 1.

Witnesses
C. E. Dunn, Inventor
by
Attorneys

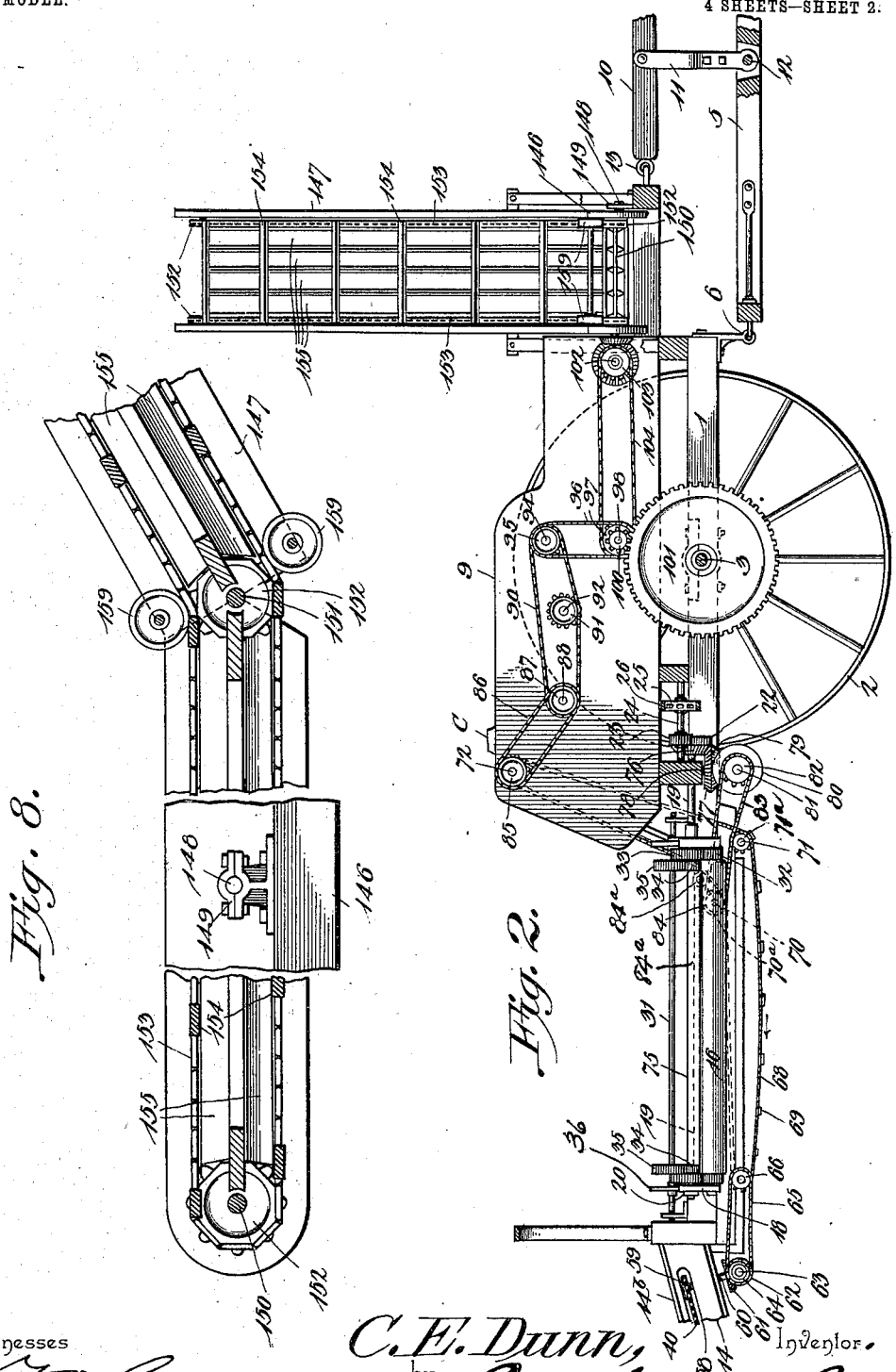

No. 735,224. PATENTED AUG. 4, 1903.
C. E. DUNN.
CORN HUSKING MACHINE.
APPLICATION FILED OCT. 26, 1901.
NO MODEL. 4 SHEETS—SHEET 3.
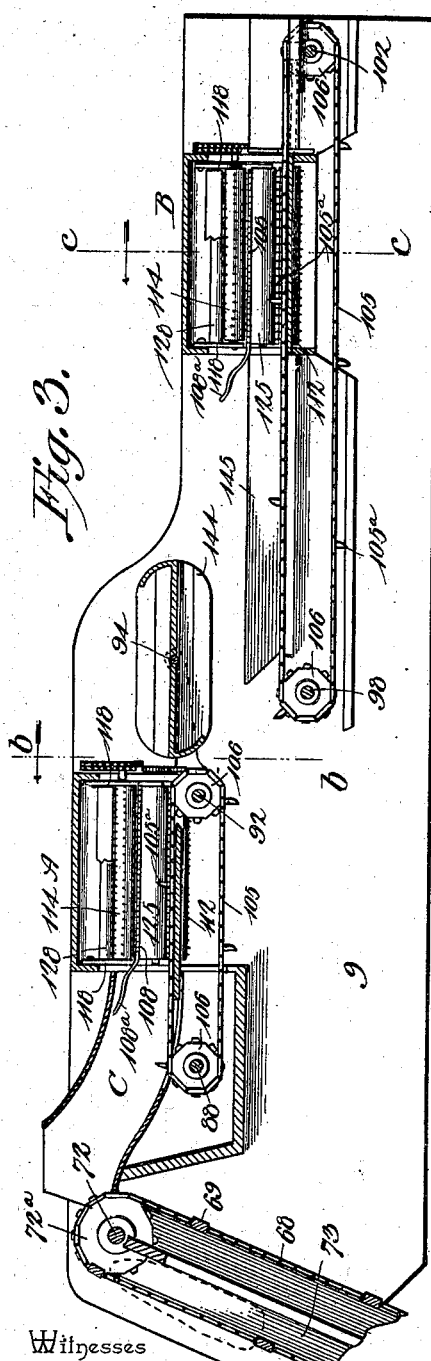
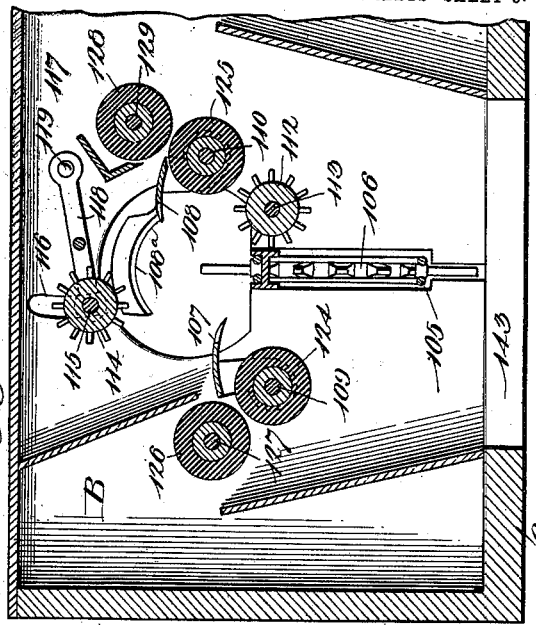
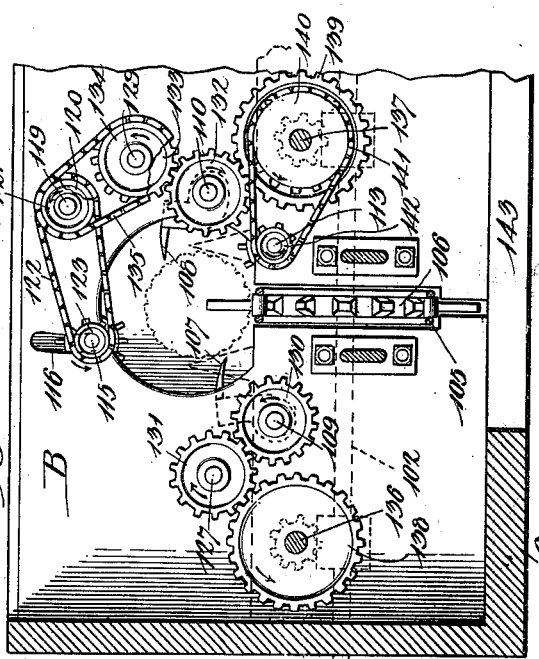
Witnesses
C. E. Dunn, Inventor.
by C. A. Snow & Co.
Attorneys No. 735,224. PATENTED AUG. 4, 1903.
C. E. DUNN.
CORN HUSKING MACHINE.
APPLICATION FILED OCT. 26, 1901.
NO MODEL. 4 SHEETS—SHEET 4.

Witnesses
C. E. Dunn, Inventor.
by C. A. Snow & Co.
Attorneys

No. 735,224.

Patented August 4, 1903.

UNITED STATES PATENT OFFICE.

CHARLES EDWARD DUNN, OF MELROSE PARK, ILLINOIS.

CORN-HUSKING MACHINE.

SPECIFICATION forming part of Letters Patent No. 735,224, dated August 4, 1903.

Application filed October 26, 1901. Serial No. 80,114. (No model.)

*To all whom it may concern:*

Be it known that I, CHARLES EDWARD DUNN, a citizen of the United States, residing at Melrose Park, in the county of Cook and State of Illinois, have invented a new and useful Corn-Husking Machine, of which the following is a specification.

My invention is an improved corn-husking machine; and it consists in the peculiar construction and combination of devices hereinafter fully set forth and claimed.

Figure 1:
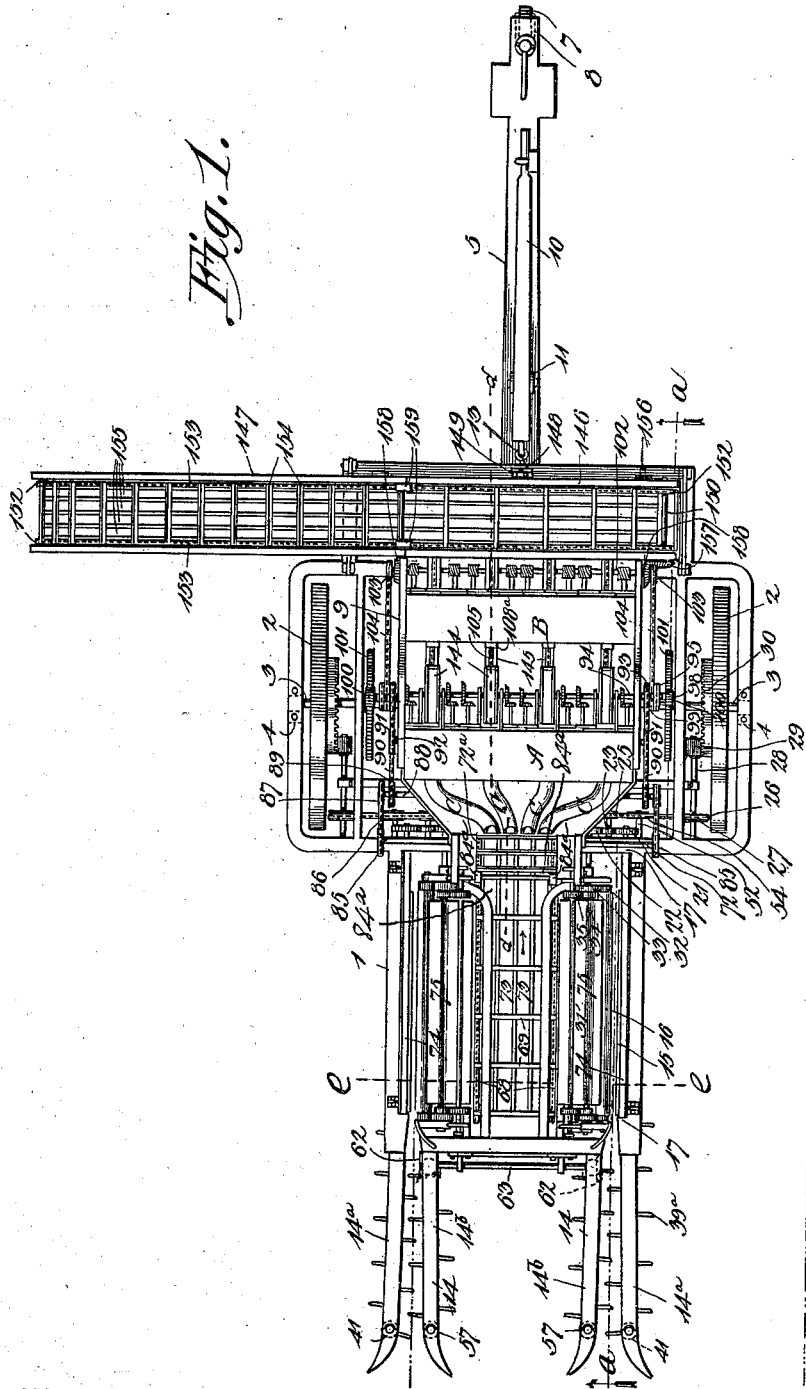
Figure 6:
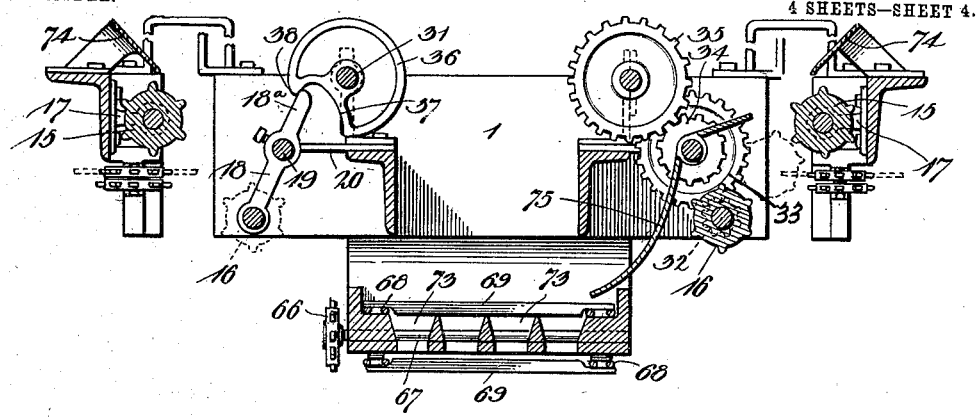
Figure 7:
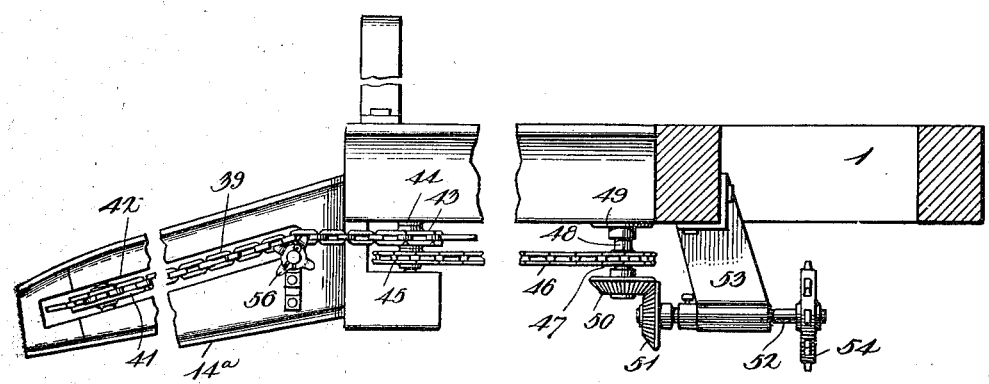

In the accompanying drawings, Figure 1 is a top plan view of a corn-harvesting machine provided with husking mechanism constructed in accordance with my improvements. Fig. 2 is a vertical longitudinal sectional view of the same, taken on a plane indicated by the line $a\ a$ of Fig. 1. Fig. 3 is a detail longitudinal sectional view of the same, taken through the husking mechanism to which the ears of corn are fed by the harvesting machinery, which snaps the ears from the standing cornstalks, the plane of which section is indicated by the line $d\ d$ of Fig. 1. Fig. 4 is a transverse sectional view of the husking mechanism, taken on a plane indicated by the line $b\ b$ of Fig. 3. Fig. 5 is a similar view of the same, taken on a plane indicated by the line $c\ c$ of Fig. 3. Fig. 6 is a vertical transverse sectional view taken through the snapping-rolls and the carrier and looking forwardly. The plane of this section is indicated by the line $e\ e$ of Fig. 1. Fig. 7 is a detail elevation, partly in section, showing the outer gatherers and the power connections for driving the same. Fig. 8 is partly an elevation and partly a sectional view of the elevator at the rear end of the harvester for delivering the harvested and husked ears of corn to a wagon driven alongside the harvesting-machine.

In the embodiment of my invention I provide a frame 1, which is supported by a pair of wheels 2 on axle-shafts 3, which aline with each other and are mounted in bearings 4 near the rear end of the frame and at the sides thereof. To the rear side of the frame 1 is flexibly or pivotally coupled the front end of a push-pole 5, as at 6, Fig. 2. The rear end of the push-pole is supported by a guide-wheel 7, which is mounted in a tiller-fork 8, which has its bearing near the rear end of the push-pole. On the rear portion or main portion of the frame 1 is supported a frame 9, which carries the husking mechanism hereinafter described and which extends rearwardly from the frame 1. A tilting-lever 10 is fulcrumed near the upper end of a link 11. The lower end of the said link is pivotally connected to the push-pole, as at 12, and the front end of the said tilting-lever is flexibly or pivotally connected to the rear side of the frame 9, as at 13. It will be understood that by operating the tilting-lever the front end of the frame 1 may be raised or lowered at will.

At opposite sides of the forwardly-extended portion of the frame 1, at the front end thereof, are two pairs of forwardly-diverging gathering-arms 14, which are appropriately spaced apart and are adapted when the machine is in operation to engage two rows of cornstalks and direct the same while standing to the snapping-rolls hereinafter described.

In rear of each pair of gathering-arms are disposed a pair of snapping-rolls 15 16. The outer snapping-rolls 15 are mounted in fixed bearings 17. The inner snapping-rolls 16 have their bearings in rock-arms 18, which are fulcrumed on shafts 19, the said shafts being journaled in fixed bearings 20. At the rear end of the shaft of each outer snapping-roll 15 is a spur-gear 21. At the rear end of each shaft 19 is a similar spur-gear 22. Pinions 23 are disposed between and mesh with said gears 21 22. Said pinions are carried by shafts 24, which are provided with sprocket-wheels 25. The latter are connected by sprocket-chains 26 to sprocket-wheels 27 on longitudinally-disposed shafts 28, which are mounted in suitable bearings and provided at their rear ends with pinions 29. Said pinions are engaged by gear-wheels 30 on the axle-shafts 3. Hence power is conveyed from the driving and supporting wheels to the outer snapping-rolls 15 and to the shafts 31, as will be understood. At the rear end of each inner snapping-roll 16 is a pinion 32. Said pinions are engaged by spur-gears 33 on the shafts 19. Said shafts are further provided with spur-gears 34, which are engaged by gears 35 on the shafts 31, which are parallel with the shafts 19. Hence power is communicated from said shafts 19 to the said snapping-rolls 16 and said shafts 31. On each of the shafts 31 at points somewhat beyond the ends of the rolls 16 are cams 36. The peripheries of the said cams are throughout nearly their entire circumferential extent concentric with said shafts 31, and the said cams are provided with reëntrant portions 37, at the front sides of which, in the direction of rotation of said cams, are shoulders 38. The rock-arms 18, which are fulcrumed on the shafts 19 and which carry the rolls 16, are provided with extensions $18^a$, which are engaged by the said cams 36. During the major portion of the rotation of the said cams the same, by coaction with the rock-arms 18, elevate the inner rolls 16 nearly to the level of the outer rolls 15, with which they coact to snap the ears from the standing cornstalks that pass between the rolls 15 and 16; but as the reëntrant portions 37 of the said cams pass the extensions $18^a$ of said rock-arms the latter are released momentarily, thereby causing the inner snapping-rolls 16 to drop to the positions shown in full lines in Fig. 6, hence discharging any material, such as blades of corn, from the said rolls 16, thereby preventing the coacting snapping-rolls from becoming clogged. It will be understood that the inner snapping-rolls 16 remain in their lowered positions only while the extensions $18^a$ of the rock-arms 18 are disposed opposite the portions 37 of said cams, and it will be understood that the shoulders 38 of the said cams, which shoulders engage said extensions $18^a$, immediately restore the said inner snapping-rolls 16 to their initial elevated positions. (Indicated in dotted lines in the right-hand portion of Fig. 6 of the drawings.) The rolls 15 16 coöperate to snap the ears of corn from the standing cornstalks while the inner rolls 16 are in their normal elevated positions. When the said inner rolls are dropped, as hereinbefore described, to clear them, they remain in their depressed position so slight a period of time as not to effect the efficiency of the rolls in snapping the ears from the stalks.

The gathering-arms are disposed at an angle with relation to the plane of the frame 1, the said gathering-arms inclining downwardly forwardly from the front side of said frame. Endless traveling gathering-chains 39 40 coact with the outer traveling arms $14^a$ and inner gathering-arms $14^b$, respectively. The gathering-chains 39 are carried by sprocket-wheels 41, which are disposed in the outer ends of slots 42, with which the gathering-arms $14^a$ are provided, and by sprocket-wheels 43, which are fast on vertical stub-shafts 44, mounted in bearings at the outer corners of the frame 1, as shown in Fig. 7. Sprocket-wheels 45 are also fast on the said stub-shafts and are connected by sprocket-chains 46 to sprocket-wheels 47 on vertical stub-shafts 48, that depend from bearings 49, with which the frame 1 is provided. At the lower ends of the shafts 48 are miter gear wheels 50, which engage similar wheels 51 on short longitudinally-disposed shafts 52, which are journaled in bearings 53. On the rear ends of the said shafts 52 are sprocket-wheels 54, which are engaged by the sprocket-chains 26 hereinbefore described. Hence power is communicated to the outer gathering-chains 39 and the same are driven, as will be understood. Said gathering-chains are provided with projecting spurs $39^a$ to engage the cornstalks. The outer leads of the said gathering-chains 39 engage direction-sprockets 56, the function of which is to maintain the said chains in operative relation to the sprocket-wheels 41.

The inner gathering-chains 40, which coact with the inner gathering-arms $14^b$, are carried by sprocket-wheels 57 in the front ends of slots 58, with which said inner gathering-arms are provided, and by sprocket-wheels 59 at the rear ends of said slots. Said sprocket-wheels 59 are carried by shafts 60, which are provided with miter-gears 61, that are engaged by similar gears 62 on a transversely-disposed stub-shaft 63. Said stub-shaft is provided with a sprocket-wheel 64, which is connected by sprocket-chains 65 to sprocket-wheels 66 on the front roller 67 of a carrier which is employed to convey the ears from the snapping-rolls to the husking mechanism. The said carrier comprises chains 68, cross-bars or flights 69, which connect said chains, and sprocket-wheels $70^a$, $71^a$, and $72^a$, which are disposed, respectively, on shafts 70, 71, and 72. The shaft 72 is journaled in an elevated position with relation to the shafts 70 71 in bearings with which the frame 9 is provided, and the sprocket-wheels $70^a$ and $71^a$ bear on the upper sides of the respective upper and lower leads of the carrier-chains 68. That portion of the carrier which is in advance of the shaft 70 is horizontal, or approximately so, and is disposed between the two pairs of snapping-rolls and below the same in position to receive the ears which are delivered from the said rolls. The rear portion of the said carrier extends upwardly, as shown in Figs. 2 and 3, to elevate the ears of corn to the husking mechanism. Longitudinally-disposed slats, which are spaced apart to form longitudinal guideways 73 and yet not so far apart as to permit ears of corn to drop between them, are disposed in such relation to the carrier that the flights or cross-slats 69 of the upper lead thereof travel over the said guideways, which latter serve to dispose the ears of corn longitudinally and preserve the same in that position while the said ears are being conveyed to the husking mechanism, so that the ears of corn will be presented endwise to the husking mechanism. It will be understood that the inner gathering-chains 40 are driven by power conveyed thereto from the carrier. The means by which the latter is driven are hereinafter described.

Laterally-inclined shields 74 are disposed over the outer portions of the outer snapping-rolls 15. Laterally-inclined deflectors 75 are disposed in such position with reference to the inner snapping-rolls and the carrier as to cause the ears of corn to be conveyed from the snapping-rolls to the said carrier.

On the shafts 19 are miter-gears 76, which engage miter-gears 77 on the lower portions of short vertical stub-shafts 78, that depend from the front portion of the frame 9. Miter-gears 79 rotate with said gears 77 and are engaged by miter-gears 80 on a transverse shaft 81, that is disposed at a suitable distance in rear of the inclined portion of the carrier. On said shaft 81 are sprocket-wheels 82, which are connected by sprocket-chains 83 to sprocket-wheels 84 on the shaft 70, and hence power is communicated to the upper lead of the carrier at this point.

Direction-rollers 84$^a$ bear on the upper lead of the carrier in rear of and somewhat above the sprocket-wheels 84 to form such an angle between the horizontal and inclined portions of the carrier to facilitate the operation of the latter in elevating the ears of corn.

On the ends of the shaft 72 are sprocket-wheels 85. The same are connected by chains 86 to sprocket-wheels 87 on a shaft 88. Said shaft 88 has sprocket-wheels 89, which are connected by sprocket-chains 90 to sprocket-wheels 91 on a shaft 92 and to sprocket-wheels 93 on a shaft 94. Said shaft 94 is also provided with sprocket-wheels 95, which are connected by sprocket-chains 96 to sprocket-wheels 97 on a shaft 98. Said shaft 98 has sprocket-wheels 99 and spur-pinions 100, the latter being engaged by gears 101 on the axle-shaft 3. A shaft 102, which is journaled in bearings near the rear end of the frame 9, is provided at its ends with sprocket-wheels 103, which are connected by sprocket-chains 104 to the sprocket-wheels 99 on shaft 98.

It will be understood from the foregoing description and by reference to the drawings that power is communicated from the axle-shaft to the shafts 72, 88, 92, 94, 98, and 102 and that since shaft 72 is an element of the carrier the latter is driven not only by power from the shaft 70, as hereinbefore described, but also by said shaft 72. Said shafts 88, 92, 94, 98, and 102 are also the power-shafts for the batteries of husking mechanisms which are employed to husk the ears of corn conveyed thereto from the harvesting or ear-snapping rolls by the carrier, and I will now describe one of said husking mechanisms.

An endless feeder-chain or other suitable flexible feeder element 105 is operated by a pair of sprocket-wheels 106. If the husking mechanism is one of the battery A, (indicated in Figs. 1 and 2 of the drawings,) said wheels 106 are carried by the shafts 88 92, but if the husking mechanism is one of battery B said wheels are carried by the shafts 98 102. The upper lead of said feeder-chain moves rearwardly between and somewhat below a pair of oppositely-disposed husking-combs 107 108. The same are respectively pivotally mounted on shafts 109 110. The upper husking-comb 108 is provided at its front end with a for- wardly extending lifting-arm 108$^a$, that is disposed above the feed-chain. The ears of corn, which are disposed endwise by the guideways of the carrier, as hereinbefore described, and fed from said guideways to the husking mechanisms of the battery A by ducts C, which are provided for that purpose, as shown in Figs. 1 and 3, pass between the feed-chain and the said lifting-arm. On one side of the upper lead of the feed-chain and at a suitable distance below the husking-comb 108 is an ear-rotating roller 112, which is carried by a shaft 113, that is journaled in fixed bearings. A similar roller 114 is disposed above and to the opposite side of the upper lead of the feed-chain and is carried by a shaft 115, that is adapted to rise and fall in slots 116 in the frame 117 of the husking mechanism and has its bearings in a pair of rock-arms 118. Said rock-arms are carried by pivots 119, on one of which, at the rear end of the frame 117, is loosely mounted a sprocket-wheel 120. A sprocket-wheel 121 is fast with said wheel 120, and the latter is connected by a sprocket-chain 122 to a sprocket-wheel 123 on the rear end of said shaft 115.

On the shaft 109 is a roller 124, preferably of rubber or other suitable elastic material, and the shaft 110 has a similar roller 125. Said rollers are respectively below and at the outer sides of the husking-combs. A roller 126 on a shaft 127 is disposed above the roller 124, and a similar roller 128 on a shaft 129 is disposed above the roller 125. Shafts 109 127 are connected together by gears 130 131. Similar gears 132 133 connect shafts 110 129 together. On the latter shaft is also a sprocket-wheel 134, which is connected by a sprocket-chain 135 to sprocket-wheel 121.

Shafts 136 137, which are geared to shaft 92 or shaft 102, as the case may be, are respectively provided with gears 138 139, which respectively engage gears 131 132. Said shaft 137 is further provided with a sprocket-wheel 140, that is connected by a sprocket-chain 141 to a sprocket-wheel 142 on the rear end of shaft 113, which carries the ear-rotating roller 112. The ear-rotating rollers 112 114 are provided with peripheral spurs, and the said rollers being revolved by the means above described engage the ears of corn as they are successively fed by the feed-chain and rotate the ears of corn between the husking-combs, the latter serving to strip off the husks as the ears pass between them, owing to the longitudinal movement and axial rotation of the ears, as will be understood. The husks as they are stripped from the ears pass outwardly between the pairs of rollers 124 126 and 125 128, being guided to said rollers by the husking-combs. The said rollers tear the husks from the butt-ends of the cobs and drop the husks through openings 143. (Shown in Fig. 5.)

Owing to the pivotal movement allowed the husking-comb 108 on the shaft 125, the arm 108$^a$ thereof, which bears on the upper side of each ear of corn as the same is fed to the husking mechanism, rises or falls, according to the size of the ear, thereby automatically setting the comb 108 in such manner as to cause its teeth to engage husks on the upper side of the ear.

The feed-chain is provided with feed-spurs 105ª, which project outwardly therefrom and are suitably spaced apart, the space between each pair of said spurs being slightly in excess of the length of an ear of corn. Said spurs by the motion of the feed-chain push the ears successively into and through the husking mechanism, as will be understood.

It is of importance to present the ears point first to the husking mechanism, as the husking-combs are more efficient to open the husks from the points than the butts of the ears, as will be understood. Hence I provide the two batteries of huskers—one in rear of the other—so that each ear of corn will pass between two huskers. In the event, however, that an ear passes butt first through the first husker, a member of battery A, it would not be husked thereby, for the reason above stated, and it therefore becomes necessary to provide means to reverse the position of said unhusked ear after the same leaves the inefficient husker and before reaching the husker in battery B in order that it be presented point first to the latter husker. To accomplish this, I provide a tumbler 144, which is carried on and partakes of the rotary movement of the shaft 94. Said tumbler after reversing the ears drops them into guides 145, that coact with the feed-chains of the huskers of battery B. Hence the efficient husking of every ear of corn is assured. The husked corn is carried from the huskers of battery B to an elevator adapted to convey the husked corn to a wagon alongside the harvester, which elevator I will now describe. Said elevator has its trunk composed of a lower section 146 and an inclined section 147. Said lower section is normally disposed in a longitudinal position transversely and in rear of the battery B of the huskers and is centrally mounted on trunnions or pivots 148, journaled in bearings 149, with which frame 9 is provided. In bearings in opposite ends of said lower section of the elevator-trunk are journaled shafts 150 151, on which are sprocket-wheels 152. The lower end of the inclined section 147 of the elevator-trunk also has bearings for said shaft 151, and hence said sections of the elevator-trunk are hinged or pivotally connected together to enable said sections to be disposed at any required angle. A shaft at the upper end of the trunk-section 147 is also provided with sprocket-wheels 152. The endless movable element of the elevator comprises a pair of sprocket-chains 153, which engage the said sprocket-wheels 152 on the various shafts of the elevator, and cross-bars or flights 154, that connect said chains and operate over guideways 155 for the ears of corn, with which said trunk-sections are provided. The trunk-section 146 is supported and maintained in a horizontal position by means of an engaging lock-pin 156 or other suitable device with which the frame 9 is provided, and said section 146 is adapted to be turned on its pivots and reversed, so as to dispose the inclined trunk-sections of the elevator on either side of the harvester at will to enable the wagon to be disposed on either side of the harvester. The shaft 150 of said elevator-trunk section 146 is provided at its front end with a miter-gear 157, which may be engaged with either of a pair of similar gears 158, with which the shaft 102 is provided.

Suitable direction-rollers 159 are provided for the trunk-section 147 to bear on the chains 153 and keep the same under all adjustments of the elevator in engagement with the sprocket-wheels 152 on the shaft 151.

Having thus described my invention, I claim—

1. The combination of an endless feed element mounted for linear movement and adapted to feed an ear of corn endwise, relatively fixed husking-combs on opposite sides of the path of the corn, and ear-revolving elements to revolve the ear in contact with the husking-combs, while the ear is passing said husking-combs, substantially as described.

2. The combination of a fixed husking-comb, an adjustable husking-comb, an endless feed element mounted for linear movement and adapted to move an ear of corn endwise between said husking-combs, means, with which the adjustable husking-comb is provided, to bear on the said ear and thereby automatically adjust said husking-comb with reference to said ear, and means to rotate said ear while the same is passing between the said husking-combs, substantially as described.

3. The combination of a relatively fixed husking-comb, rollers coacting therewith to strip the husks from an ear of corn, an endless feed element mounted for linear movement and adapted to move an ear of corn endwise past said husking-comb, and means to rotate said ear while the latter is passing said comb, substantially as described.

4. The combination of a relatively fixed husking-comb, a pair of rollers disposed beyond the outer side thereof, said comb having its outer side disposed opposite the coacting sides of said rollers, an endless feed element mounted for linear movement and adapted to feed an ear of corn endwise past said husking-comb and means to rotate said ear of corn while the same is passing said comb, substantially as described.

5. The combination of a relatively fixed husking-comb, an endless feed element mounted for linear movement and adapted to move an ear of corn endwise past the said comb, and a revoluble toothed roller to engage and rotate the ear while the same is passing the comb, substantially as described.

6. The combination of a pair of relatively fixed husking-combs disposed opposite each other, an endless feed element mounted for linear movement and adapted to move an ear of corn endwise past and between the combs, and revoluble toothed rollers, above and below the path of the ear to engage and rotate the same, while the ear is passing said combs, substantially as described.

7. The combination of means to move an ear of corn endwise, a pair of oppositely-disposed husking-combs, between which the ear passes, one of said combs being adjustable and having means to bear on the ear and automatically adjust the said comb with reference to the size of the ear, and revoluble toothed rollers, below and above the path of the ear, to engage and rotate the latter while the ear is passing said combs, and movable bearings for the upper roller, to enable the same to automatically adjust itself to the size of the ear, substantially as described.

8. In combination with a pair of husking mechanisms, one in advance of the other, means to reverse an ear of corn between said husking mechanisms, substantially as described.

9. In combination with a pair of husking mechanisms, one in advance of the other, a tumbler disposed between said husking mechanisms, to reverse an ear of corn between them, substantially as described.

10. In combination with a pair of husking mechanisms, one in advance of the other, a guideway leading to the rear husking mechanism, and a revoluble tumbler, disposed to receive an ear of corn discharged from the front husking mechanism, reverse the position thereof, end to end, and drop the ear when reversed into said guideway, substantially as described.

11. In a machine of the class described, a frame, and an elevator disposed transversely with relation to said frame, said elevator having a trunk comprising a plurality of sections, flexibly connected together, one of said sections being pivotally mounted and adapted to be reversed to dispose said elevator on either side of said machine, substantially as described.

12. In a machine of the class described, the combination of a main frame, driving-gears on opposite sides thereof, and an elevator having a trunk-section pivotally mounted and adapted to be reversed, said pivotally-mounted trunk-section having a gear adapted to be disposed in operative relation to either of said driving-gears of said main frame, substantially as described.

In testimony that I claim the foregoing as my own I have hereto affixed my signature in the presence of two witnesses.

CHARLES EDWARD DUNN.

Witnesses:
 G. H. BOHLANDER,
 GERDA ANDERSON.